United States Patent [19]
Seki et al.

[11] 3,939,039
[45] Feb. 17, 1976

[54] REACTOR CORE CLAMPING DEVICE

[75] Inventors: Katumi Seki; Masaru Kawara; Yasuo Tachi, all of Hitachi, Japan

[73] Assignee: Hitachi, Ltd., Tokyo, Japan

[22] Filed: July 12, 1973

[21] Appl. No.: 378,690

[30] Foreign Application Priority Data
July 12, 1972   Japan.............................. 47-69064

[52] U.S. Cl.................................... 176/87; 176/76
[51] Int. Cl............................................. G21c 3/12
[58] Field of Search........................ 176/87, 76, 78

[56] References Cited
UNITED STATES PATENTS
| | | | |
|---|---|---|---|
| 3,549,491 | 12/1970 | Johnson................................ | 176/87 |
| 3,635,793 | 1/1972 | Kolb et al............................. | 176/87 |

*Primary Examiner*—Benjamin A. Borchelt
*Assistant Examiner*—C. T. Jordan
*Attorney, Agent, or Firm*—Thomas E. Beall, Jr.

[57] ABSTRACT

A nuclear reactor with a reactor core having a plurality of individual core elements is provided with a clamping device for at least some of the core elements, which clamping device includes a plurality of pawls pivotally mounted to the interior of each wall of the hexagonal outer wrapping tube for movement between a position within the wrapper tube and a position extending through an adjacent hole in the side wall of the wrapper tube, and an operating tube axially slidably mounted within the wrapper tube for moving the pawls between their two positions. When the pawls are extended by the operating tube, they will move outwardly a predetermined distance transversely of the core element to cooperatively engage other core elements and clamp the assembly. A lock mechanism is provided to lock the operating tube and wrapper tube in one position of the pawls, preferably the withdrawn position, to assist in inserting and removing the core element.

14 Claims, 8 Drawing Figures

REACTOR CORE CLAMPING DEVICE

BACKGROUND OF THE INVENTION

The present invention relates to means for securing a plurality of core elements within the core of a nuclear reactor, particularly a fast breed reactor.

In the core of fast breed reactors, there are inserted nuclear fuel materials, for example $U^{235}$, $PU^{239}$, etc., which will produce a tremendous quantity of energy by reacting with neutrons. The nuclear fuel materials are not usually inserted with their surfaces exposed in the core; they are usually inserted within a wrapper tube containing a predetermined number of metal tubes such as stainless steel tubes, each of which contains the nuclear fuel material therein so as not to directly contact the nuclear fuel with the coolant that circulates throughout the core. The fuel assemblies including the wrapper tube having the predetermined number of metal tubes are commonly deformed arcuately or bent arcuately during operation of the nuclear reactor because of the materials being eradiated by a large quantity of fast neutrons. The degree of this bend or deformation varies in accordance with the integrated magnitude of eradiation by the neutrons, and the amount of the bend often reaches the magnitude of 40 to 50mm at the top of the fuel assembly according to a calculated result obtained with a formula commonly used for this purpose, in the case where the fuel assembly for a practical reactor is exchanged once in 6 months.

In addition to the above-mentioned fuel assemblies, a plurality of neutron shields, control rods, and blanket fuel assemblies are associated in the reactor core. All of these elements, including the fuel assemblies, may be referred to as core elements. Gaps of 3 to 5mm between the core elements are generally kept so that they may be easily pulled out or removed from the reactor core. When the core elements such as the fuel assemblies, the neutron shields, etc., are bent arcuately as above-mentioned, these gaps will disappear due to the bending, which will bring about many bad results, for example difficulty in inserting safety rods or control rods, impossibility of fuel exchanges, or blockages of the passage of the coolant. Therefore, it is desirable to prevent the fuel assemblies, control rods, neutron shields and the like core elements from bending in this manner.

SUMMARY OF THE INVENTION

It is an object of the present invention to provide a nuclear reactor core clamping device which effectively prevents the core elements, such as fuel assemblies, guide tubes for control rods, blanket fuel assemblies, and neutron shields, from deforming or bending within the core assembly during use.

The above is accomplished by providing a reactor core clamping device that is operated from within the interior of the core elements, which is simple in construction, and has a reliability for prevention of deformation of the individual core elements.

A plurality of the core elements such as fuel assemblies, blanket fuel assemblies, guide tubes for control rods, and neutron shields are substantially vertically arranged with parallel axes within the reactor core with predetermined gaps provided between adjacent core elements. The reactor core clamping device according to the present invention is constructed so that it may be associated with one or more of the core elements and is provided with projection means that will project outwardly from the respective core elements into the gaps between adjacent core elements to prevent the core elements from arcuately bending into such gaps, and each of the projection means is operated through a mechanism disposed in its respective core element.

BRIEF DESCRIPTION OF THE DRAWING

Further objects, features and advantages of the present invention will become more clear from the following description of a preferred embodiment of the present invention with reference to the accompanying drawing, wherein.

DETAILED DESCRIPTION OF THE PREFERRED EMBODIMENT

Figure 1:
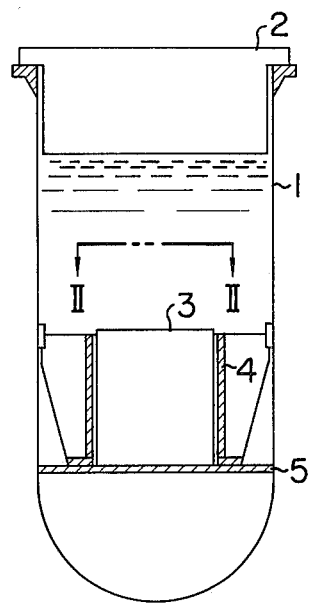
FIG. 1 is a longitudinal cross sectional view of a schematic representation of a nuclear reactor that may employ the features of the present invention.

FIG. 1 shows a schematic arrangement of a fast breed reactor, which generally may be of any commonly known type. The reactor comprises a container 1, a plug 2 for enclosure of the container 1 at the upper portion of the container 1, and a reactor core 3 that is disposed on a core support structure 5 fixed to the side wall of the container 1 with a core barrel 4 surrounding it, which core barrel 4 is disposed on the core support structure 5.

Figure 2:
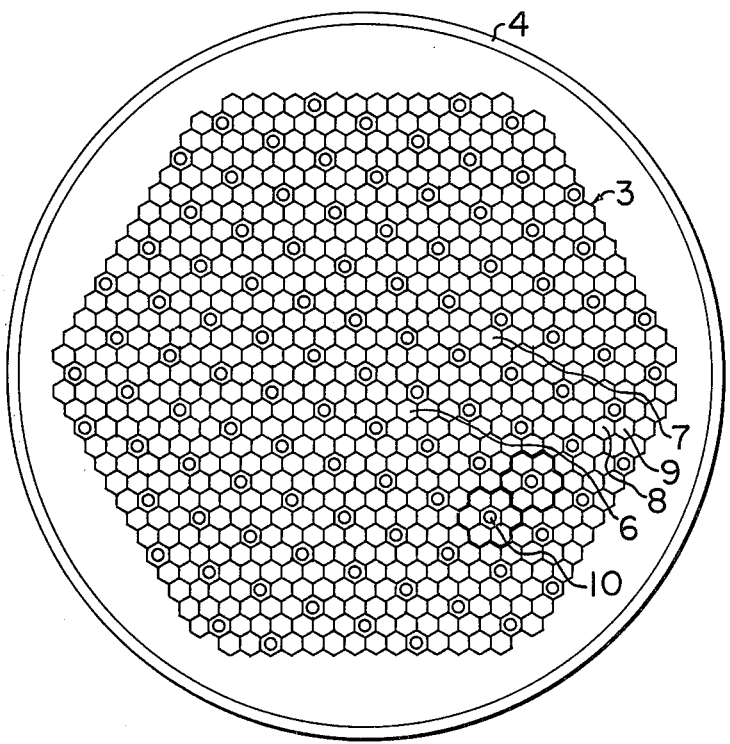
FIG. 2 is a plan view, in greater detail, of FIG. 1 taken from line II—II and showing the core assembly.

As shown in FIG. 2, the reactor core 3 comprises a plurality of core elements, which core elements may include fuel assemblies 6 which are arranged in the central region of the reactor core 3, guide tubes 7 for receiving therein control or safety rods that are arranged among the fuel assemblies 6, blanket fuel assemblies 8 which are arranged generally surrounding the fuel assemblies 6, and neutron shields 9 that are arranged generally surrounding the blanket fuel assemblies 8. The exact arrangement and composition of the core elements in general may be dictated by practical considerations and forms no part of the present invention, except insofar as some of the core elements will have the core clamping means of the present invention.

Although the clamping means may be disposed throughout the core in any desired pattern, it is preferred that the core elements 10 having an outer hexagonal shape and an inner circle representation in FIG. 2 be provided with the clamping means of the present invention, which clamping core elements 10 are enclosed with six core elements of any type not having the clamping features, which pattern of seven core elements is repeated throughout the entire core assembly.

While the clamping means may be associated with any of the core elements mentioned above or core elements of other types, FIG. 3 shows a cross sectional view of a fuel assembly clamping core element, with it being understood that the clamping features of the present invention according to the preferred embodiment would be identical with respect to any of the other clamping core elements.

Figure 3:
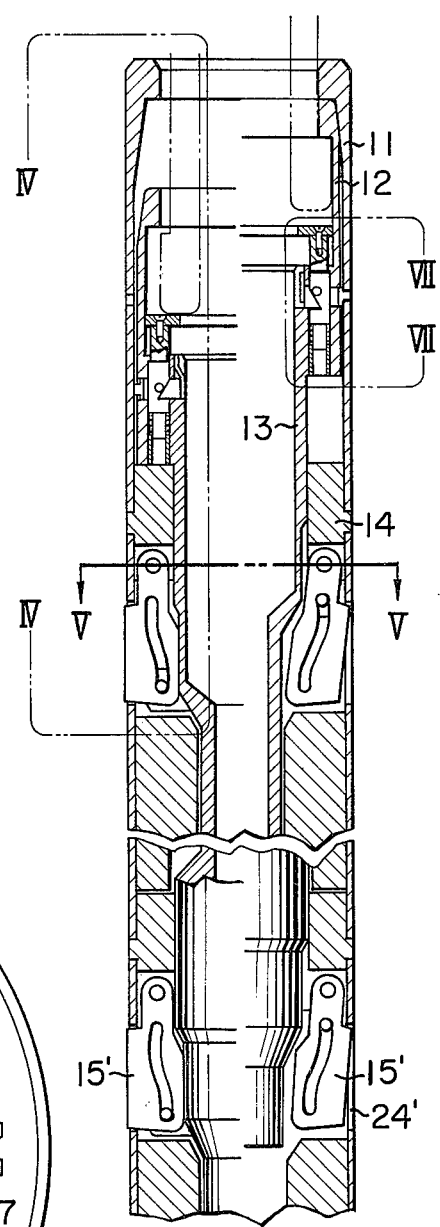
FIG. 3 is a longitudinal or vertical cross sectional view through a core assembly of one embodiment according to the present invention.

FIG. 3 shows the upper portion of the fuel assembly 6 with the clamping device of the present invention applied to it, wherein the right hand portion shows the clamping device not in operation or withdrawn, and the left hand portion shows the condition of the clamping device in operation or projected to clamp adjacent core elements. The right and left hand portions are different only for purposes of illustration, and it is understood that in the actual device the right and left hand portions would be mirror images of each other and operate in unison.

Figure 4:
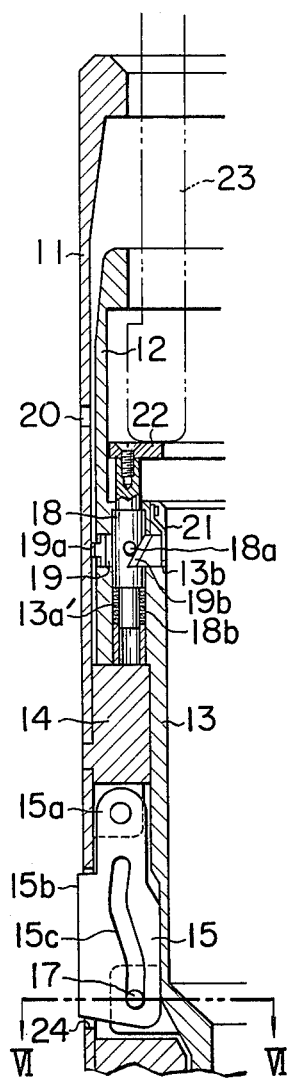
FIG. 4 is an enlarged view of the portion enclosed with line IV—IV in FIG. 3.
Figure 5:
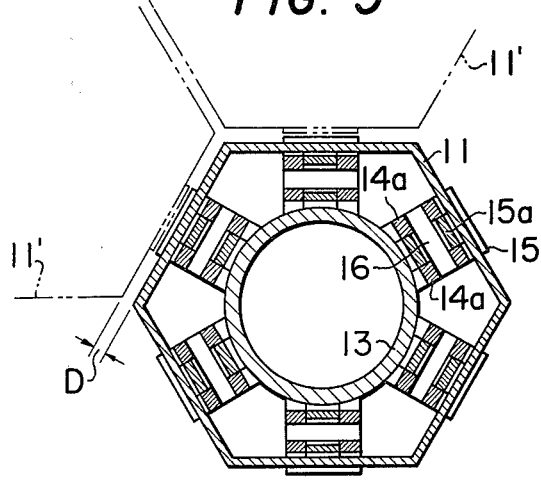
FIG. 5 is a cross sectional view taken along line V—V of FIG. 3.
Figure 6:
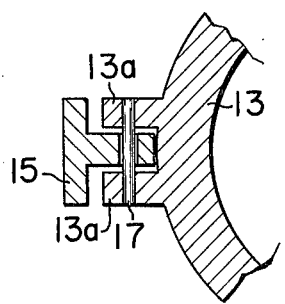
FIG. 6 is a fragmented view of FIG. 4 in cross section taken along line VI—VI.

As shown in FIG. 3, the exterior of the fuel assembly 6, having the clamping device of the present invention, comprises a wrapper tube 11, which is in the form of a hexagonal tube. The interior of the wrapping tube 11 is formed to slidably and telescopically receive the handling head 12, which as indicated is hollow and forms a part of the general operating tube 13, that is the handling head 12 and operating tube 13 are rigidly connected together and axially slidably mounted with respect to the wrapper tube 11. The operating tube 13 extends downwardly within and is guided with respect to the wrapper tube 11 by the inner faces of a plurality of guide blocks 14 that are fixed to the inner side walls of the wrapper tube 11; this rigid connection between the guide blocks 14 and wrapper tube 11 may be formed by the indicated projections and holes, or any other suitable means. Some ones of the plurality of guide blocks 14 may each have two spaced downwardly extending projections or ears 14a on the lower end thereof as best shown in FIG. 5. A pawl 15 for clamping the core elements is pivotally connected between the projections 14a of the respective guide block 14 by means of a bearing pin 16 at the upper end 15a of the respective pawl 15. Each of the pawls 15 has a projection 15b, which extends outwardly from the wrapper tube 11 through an adjacent hole 24 provided in the adjacent side wall of the wrapper tube 11 in the extreme extended or projecting position of the pawl as shown in the left hand portion of FIG. 3, and further each of the pawls 15 may be pivoted about its mounting pin 16 to be withdrawn within the wrapper tube 11 for its extreme withdrawn position as shown in the right hand portion of FIG. 3. A curved cam slot 15c, as more clearly shown in FIG. 4, is provided in each of the pawls 15 for cooperative camming engagement with a cam pin 17 that is rigidly attached between two arms 13a that rigidly extend from the operating tube 13, which elements are further shown in FIG. 6.

With the above arrangement, it is seen that if starting with the position of the operating tube as illustrated in the right hand portion of FIG. 3, the operating tube 13 is moved downwardly, the pins 17 will correspondingly move axially downward and because of the cam pin and cam slot connection 17, 15c, the pawls 15 will pivot about their pivot pins 16 so as to extend their projections 15b through the holes 24, respectively, in the wrapper tube walls so that in the extreme lower position of the operating tube, the pawls 15 will assume the position as shown in the left hand portion of FIG. 3, for a clamping engagement with adjacent core elements.

The wrapper tube 11 has a further plurality of pawls 15' located at about the middle portion of the core element, with respect to the vertical direction or the longitudinal extent of the core element. These pawls 15', their mounting structure and their related cooperating structure are substantially identical to the previously discussed pawls 15, and they will extend through the correspondingly formed holes 24' in the walls of the wrapper tube 11. Thus, all of the pawls 15, 15' will be operated simultaneously and in the same manner by movement of the single operating tube 13 for each of the core elements. The pawls 15 are considered as being adjacent the upper or outer end of the core element. The pawls 15 are respectively associated with each of the six walls of the hexagonal wrapper tube 11, and correspondingly the pawls 15' are respectively associated with each of the six walls of the hexagonal wrapper tube 11, as more clearly shown in FIG. 5. In FIG. 5, the clamping core element shown in solid lines is schematically shown in the clamping position for two adjacent core elements 11', although it is understood that the clamping core element is preferably surrounded by six adjacent core elements as shown in FIG. 2, which surrounding core elements may or may not be of the clamping variety. In any event, the pawl projections 15b of the clamping core element will extend outwardly to engage the clamping surfaces of adjacent core elements. In usual practice, the core elements are inserted within mounting apertures at their lower ends, and with the present invention the projecting means will rigidly clamp the core elements together at their mid portions at at their upper or outer portions, so that the core will effectively be rigid while allowing gaps between the core elements in the areas other than the very small areas occupied by the projections 15b for the purpose of circulating cooling water, and this rigid clamping will prevent the previously mentioned bending or warping of the core elements.

Further, on the upper portion of the operating tube 13, there is provided a lock mechanism for fixing the operating tube 13 with respect to the wrapper tube 11, to selectively prevent relative movement therebetween. This lock mechanism includes rods 18 that are slidably inserted within bores 13a' formed in the upper portion of the operating tube 13 and extending in the longitudinal direction, locked pins 19 each of which is slidably mounted within transverse bores 13b, which extend at right angles to the axis of the rod 18 and further generally perpendicular to the adjacent side wall of the wrapper tube 11. The lock pins 19 that are mounted within their bores in the operating tube 13 have projections 19a for engagement within correspondingly shaped respective holes 20 formed in the adjacent side walls of the wrapper tube 11. The lock pins 19 further have a wedge or cam face as particularly shown in FIGS. 4, 7 and 8, which cam face 19b is at the intermediate portion of the lock pin 19 for horizontally displacing the lock pin 19 in response to vertical movement of the pin 18a that is fixed to the rod 18, plate or leaf springs 21 having one end fixed to the operating tube 13 and their other end engaging and biasing the respective lock pin 19 toward the adjacent cooperating side wall of the wrapper tube 11, coil springs 18b disposed within the bore 13a' and encircling the small diameter lower end of the rod 18, to bias the rod 18 upwardly in FIG. 4 and FIG. 7, and an operating or push plate 22 rigidly and drivingly connected to all of the rods 18 by means of threaded fasteners or the like. A separate lock pin arrangement may be provided for some or all of the side walls of the wrapper tube 11, but in any event it is preferred that they be simultaneously operated by means of the plate 22. It is seen that when the projection 19a is aligned with the hole 20 in the wrapper tube 11, the springs 21 and 18b will automatically cause the projection 19a to enter the hole 20 and lock the tubes 11, 13 against relative movement as shown in the right hand portion of FIG. 3, which position corresponds to the withdrawn position of the projection pawls 15.

When the fuel assembly 6, or as previously mentioned any other clamping core element, is being suspended by a gripper shown at 23 in FIG. 4 and correspondingly shaped dot-dash lines in FIG. 3, by engagement of the upwardly facing shoulder portion of the gripper with the downwardly facing shoulder portion of the operating tube 13, for inserting the core element within the reactor core or for withdrawing the core element out from the reactor core 3, the lock pins 19 of the lock mechanism will be inserted within the corresponding holes 20 of the wrapper tube 11 with the handling head 12 and operating tube 13 pulled upwardly within the wrapper tube 11 all as shown in the right hand portion of FIG. 3. Accordingly, the pawls 15, due to the cam pin and cam slot connection, will be withdrawn and within the wrapper tube 11, which will provide the gap between adjacent core elements for lossed transverse motion and ease in assembly and disassembly of core elements.

When inserting a core element with the clamping features of the present invention within a reactor core, the gripper 23 will move downwardly until the lower end of the core element or fuel assembly 6 is received within the mounting structure of the core support, at which time the wrapper tube 11 may not move down further, thereafter the gripper 23 will move further downward while the tubes 11 and 13 remain stationary until the gripper 23 pushes down upon the upper surface of the pusher or operating plate 22. With further downward movement of the gripper 23, the pusher plate 22 will move downward to correspondingly downwardly move the rods 18 against their spring bias force and accordingly displace the lock pins 19 horizontally inwardly to remove them from the cooperating holes 20 in the inner wall of the wrapper tube 11 due to the cooperating wedge cam surfaces 19b and 18a. Thereby, the projection 19a of the lock pin 19 will be removed from the associated hole 20 of the wrapper tube 11 and the operating tube 13 and wrapper tube 11 will be free for relative axial movement, that is unlocked. After the lock mechanism has been unlocked, the operating tube 13 will be further lowered by the gripper bar 23 with respect to the now stationary outer wrapper tube 11. As the operating tube 13 is thus lowered, the pawls 15 will be pivoted from their right hand position of FIG. 3 outwardly to their left hand position of FIG. 3 by means of the cam pin 17 and cam slot 15c connection. Thus, the pawl projection portions 15b will project outwardly from the outer surface of the wrapper tube 11 by about one-half of the distance or gap D between adjacent fuel assemblies as shown in FIG. 5 to clamp the assemblies; it being realized that the adjacent core elements will have corresponding projections either fixed or correspondingly movable by mechanisms identical to that described above so that the complete gap D will be bridged by the clamping members. Further, it is seen that the outer wall of the operating tube 13 in the vicinity of the clamping pawls 15, 15' is made up of several different diameters with cam portions therebetween, so that in the projected position of the pawls, as most clearly shown in FIG. 4, the pawl will be fully projected by the pin 17 so that its outer surface at 15b will engage an adjacent projection of a corresponding adjacent core element while the opposite side of the pawl 15 will be in clamping contact with the outer wall of the operating tube 13 to provide a particularly rigid clamping assembly.

When the fuel assembly 6 is pulled out from the reactor core 3, the operating tube 13 will be raised by ascent of the gripper 23 with the handling head 12 being engaged by the gripper 23. The projections 15b of the pawls 15 will be withdrawn from the associated holes within the wrapper tube 11 through ascent of the pins 17 within the cam slots 15c. After withdrawal of the pawls 15 to the position shown in the right hand portion of FIG. 3, the operating tube 13 further ascends until the operating tube 13 reaches the position where the lock pins 19 align with the horizontal axis of the holes 20 of the wrapper tube 11 where the lock pins 19 will be automatically inserted within the holes 20 by means of the biasing force of the leaf spring 21 in cooperation with the biasing force of the spring 18b. Thereby, the fuel assembly 6 will be a rigid assembly with its projections withdrawn so that the wrapper tube 11 and entire assembly may be pulled out from the reactor core 3 by the gripper 23.

Figure 7:
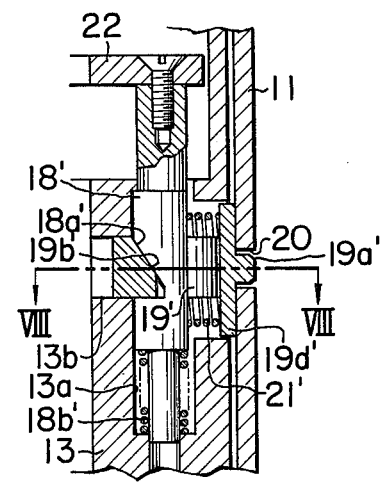
FIG. 7 is an enlarged view of the portion enclosed by line VII—VII of FIG. 3, but with variations of the lock mechanism.
Figure 8:
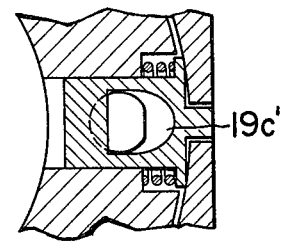
FIG. 8 is a partial cross sectional view taken along line VIII—VIII in FIG. 7.

Another embodiment of the lock mechanism is shown in FIG. 7 and in FIG. 8. Each of the rods 18' fixed to the push plate 22 has a sloping surface 18a' at its mid portion, and forms a small diameter at the lower end portion thereof. The lower end portion of the rod 18' is slidably inserted within the bore 13a. A coil spring 18b' is disposed between the rod 18' and the operating tube 13 to exert the upward force on the tube 18'. The lock pin 19' is arranged so that the axis of the lock pin 19 traverses the axis of the vertical rod 18' at a right angle. The lock pin 19' has a flange portion 19d', a projection 19a' at the end portion thereof and a hole 19c' for engagement with the rod 18'. The hole 19c' has a sloping or wedge surface 19b' engaging with the sloping or wedge surface 18a' of the rod 18'. The projection 19 a' of the lock pin 19' will be inserted within the hole 20 of the wrapper tube 11 when aligned by the force exerted by the coil spring 21' disposed between the flange portion 19d' and the operating tube 13. The lock mechanism operates in the same manner as the previously described lock mechanism shown in FIGS. 3 through 6.

While a preferred embodiment of the present invention has been specifically illustrated, particularly with the clamping device being associated with a fuel assembly type core element, it is understood that the clamping device may be associated with any other type of core element, and further while the core as shown in FIG. 2 has been represented by a repeat pattern of a central clamping core element surrounded by six non-clamping core elements, it is understood that any number of the core elements may have the clamping features of the present invention, including the situation where all of the core elements may have such clamping features. Further modifications, embodiments and variations of the present invention are contemplated within the spirit and scope of the invention as defined by the following claims.

What is claimed is:

1. For use in a nuclear reactor having a core, a clamping device for clamping a plurality of core elements together in forming the core, comprising: projection means being movably mounted on a core element for movement between a withdrawn position and a position projecting outwardly from a core element toward another core element when the core elements are arranged within the core of a nuclear reactor; operating means for moving said projection means from its withdrawn position to its projected position a predetermined length to clamp the core element in cooperation with other core elements of the nuclear reactor core; a wrapper tube forming the exterior of the core element mounting with its longitudinal axis extending generally vertical in the reactor core and being of hexagonal shape in horizontal cross section; said projection means being provided adjacent the upper portion of said wrapper tube; said operating means being mounted within said wrapper tube for vertical movement; said wrapper tube having a hole within one of its side walls for said projection means; said projection means moving generally horizontally from within said wrapper tube in its withdrawn position horizontally through its hole to project horizontally beyond said hole and outside of said wrapper tube in its projected position; and separate lock means for locking said vertically moving operating means and said wrapper tube against relative movement in one of said projection means positions.

2. The apparatus of claim 1, wherein a separate one of said projection means is provided in each of the side walls of said hexagonal wrapper tube.

3. The apparatus of claim 2, wherein said operating means simultaneously moves all of said projection means.

4. The apparatus of claim 2, wherein a plurality of core elements are arranged with their axes parallel with respect to each other in the core of the nuclear reactor with six core elements surrounding a clamping core element respectively adjacent the six walls of the hexagonal clamping core element, further wherein only the central clamping core element of the seven core elements is provided with said projection means and said operating means, and further wherein said pattern of seven core elements is repeated throughout the reactor core.

5. The apparatus of claim 1, wherein a first set of said projection means respectively for all of said hexagonal wrapper tube side walls is provided generally adjacent the upper end of said wrapper tube, and further including a second set of said projection means for all of said hexagonal wrapper tube side walls being provided generally adjacent the middle portion of said wrapper tube.

6. The apparatus of claim 5, wherein said operating means simultaneously moves all of said projection means.

7. For use in a nuclear reactor having a core, a clamping device for clamping a plurality of core elements together in forming the core, comprising: projection means being movably mounted on a core element for movement between a withdrawn position and a position projecting outwardly from the core element toward another core element when the core elements are arranged within the core of a nuclear reactor; operating means for moving said projection means from its withdrawn position to its projected position a predetermined length to clamp the core element in cooperation with other core elements of the nuclear reactor core; a wrapper tube having a longitudinal axis to be parallel with the longitudinal axes of other wrapper tubes when mounted within the nuclear reactor core and having a hexagonal shape in cross section transverse to said longitudinal axis; said projection means including a plurality of pawls pivotally connected to said wrapper tube, and each pawl having a configured cam slot spaced from said pivotal connection; said operating means including an operating tube mounted within said wrapper tube for axial longitudinal movement with respect to said wrapper tube, and said operating tube having a plurality of arms mounting a plurality of pins each in engagement within a corresponding curved configured cam slot of said pawls; said wrapper tube having a hole in its side walls immediately adjacent each of said pawls; and said operating means projecting said pawls through their respective wrapper tube holes by movement of said operating tube axially with respect to said wrapper tube to correspondingly move said pins in the same direction relative to said cam slots for camming said pawls about their pivotal connections through their respective holes.

8. The apparatus of claim 7, including a plurality of guide blocks fixedly mounted on the interior of said wrapper tube for guidingly engaging said operating tube with axial sliding contact; each of said plurality of pawls being pivotally connected respectively to each of said guide blocks.

9. The apparatus of claim 7, wherein the upper portion of said operating tube is provided with operating head means for engagement with a gripper to move said operating tube axially with respect to said wrapper tube.

10. The apparatus of claim 7, further including lock means for selectively locking said operating tube and said wrapper tube against axial movement in one of the positions of said projection means, said lock means comprising a plurality of rods axially mounted within bores in the upper portion of said operating tube, first spring means for biasing said rods axially in one direction, a lock operating plate drivingly connected to said rods for moving said rods axially in the opposite axial direction against the spring bias, a plurality of lock pins slidably mounted within bores of said operating tube for movement transversely with respect to the movement of said rods, a plurality of apertures in the side wall of said wrapper tube being aligned with said lock pins in said one position of said projection means, second spring means for biasing said lock pins transversely into engagement with said apertures, respectively, and means provided on each of said rods and each of said lock pins for converting the axial movement of each of said rods into the transverse movement of said lock pins so that movement of said rod operating plate in said opposite direction will correspondingly move all of said rods in their direction against their spring force, to correspondingly move all of said lock pins against their spring bias in the direction to withdraw them from the apertures in said wrapper tube, respectively.

11. The apparatus of claim 10, including a plurality of guide blocks fixedly mounted on the interior of said wrapper tube for guidingly engaging said operating tube with axial sliding contact; each of said plurality of pawls being pivotally connected respectively to each of said guide blocks.

12. The apparatus of claim 7, wherein said wrapper tube is hexagonal; a projection means pawl is provided for each of the side walls of said hexagonal wrapper tube for respectively extending therethrough adjacent one longitudinal end.

13. The apparatus of claim 12, including a second set of pawls generally identical to said previously mentioned pawls and provided for each of the wrapper tube side walls generally adjacent the middle portion of said wrapper tube.

14. The apparatus of claim 12, wherein a plurality of said core elements are mounted with their wrapper tubes and operating tubes generally axially parallel with respect to each other, and further wherein said pawls project transversely from their respective wrapper tube side walls approximately one-half the gap distance between the associated adjacent wrapper tube walls.

* * * * *